(12) United States Patent
Takahashi et al.

(10) Patent No.: US 9,016,479 B2
(45) Date of Patent: Apr. 28, 2015

(54) DEVICE AND METHOD OF SCREENING FOR INDIVIDUAL BALLS

(75) Inventors: Rui Takahashi, Kumagaya (JP); Hiroyuki Takatsuka, Yasugi (JP)

(73) Assignee: Hitachi Metals, Ltd., Tokyo (JP)

( * ) Notice: Subject to any disclaimer, the term of this patent is extended or adjusted under 35 U.S.C. 154(b) by 470 days.

(21) Appl. No.: 12/161,004

(22) PCT Filed: Nov. 15, 2007

(86) PCT No.: PCT/JP2007/072181
§ 371 (c)(1),
(2), (4) Date: Jul. 15, 2008

(87) PCT Pub. No.: WO2008/062710
PCT Pub. Date: May 29, 2008

(65) Prior Publication Data
US 2010/0170832 A1    Jul. 8, 2010

(30) Foreign Application Priority Data
Nov. 20, 2006   (JP) .................. 2006-312772

(51) Int. Cl.
| | | |
|---|---|---|
| *B07B 13/10* | (2006.01) | |
| *B07B 13/11* | (2006.01) | |
| *B07B 13/00* | (2006.01) | |
| *B23K 35/40* | (2006.01) | |

(52) U.S. Cl.
CPC ............... *B07B 13/11* (2013.01); *B07B 13/003* (2013.01); *B23K 35/40* (2013.01)

(58) Field of Classification Search
CPC ....... B07B 13/10; B07B 13/11; B22F 1/0014; B22F 1/0048

USPC .................. 209/11, 638, 641, 908, 910, 911
See application file for complete search history.

(56) References Cited

U.S. PATENT DOCUMENTS

| | | | |
|---|---|---|---|
| 816,901 A | * | 4/1906 | Devers ..................... 209/638 |
| 3,899,416 A | * | 8/1975 | Schwartz et al. ............. 209/638 |

(Continued)

FOREIGN PATENT DOCUMENTS

| | | |
|---|---|---|
| CN | 1530178 | 9/2004 |
| CN | 2664797 | 12/2004 |

(Continued)

OTHER PUBLICATIONS

"Office Action of Taiwan Counterpart Application", issued on May 4, 2011, p. 1-p. 5, in which the listed references were cited.

Primary Examiner — Joseph C Rodriguez
(74) Attorney, Agent, or Firm — J.C. Patents

(57) ABSTRACT

A device and a method of screening for individual balls are provided. The device for screening for individual balls has a supply device, a slope, and a recovering part jointed to a gas-tight chamber, and has a pressure reducing device for decompressing and maintaining the pressure of the gas-tight chamber lower than 1000 Pa in the gas-tight chamber. The supply device is used for supplying the balls, the slope is used for enabling the balls to roll down, and the recovering part is used for recovering the balls from the slope. Further, the method for screening for individual balls includes supplying the balls from the supply device to the slope, rolling the balls down the slope, screening for the balls according to the speed is difference and/or the direction difference of the balls, and recovering the balls in the recovering part, in the gas-tight chamber with the pressure below 1000 Pa.

18 Claims, 8 Drawing Sheets

(56) References Cited

U.S. PATENT DOCUMENTS

| | | | | |
|---|---|---|---|---|
| 3,969,224 | A | * | 7/1976 | Cerbo .......................... 209/12.1 |
| 4,277,273 | A | * | 7/1981 | Legille et al. .................... 65/19 |
| 5,080,235 | A | * | 1/1992 | Nichols et al. ................ 209/700 |
| 5,106,487 | A | * | 4/1992 | Nemedi ....................... 209/44.2 |
| 5,791,493 | A | * | 8/1998 | Meyer .......................... 209/245 |
| 6,818,849 | B2 | * | 11/2004 | Itou et al. ...................... 209/586 |
| 6,830,175 | B2 | * | 12/2004 | Ito .................................. 228/41 |

FOREIGN PATENT DOCUMENTS

| | | | | |
|---|---|---|---|---|
| JP | 11-318728 | | 11/1999 | |
| JP | 11-319722 | | 11/1999 | |
| JP | 11319728 A | * | 11/1999 | ............. B07B 13/11 |
| JP | 2002-052363 | | 2/2002 | |
| TW | 214140 | | 10/1993 | |
| TW | M279433 | | 11/2005 | |

* cited by examiner

DEVICE AND METHOD OF SCREENING FOR INDIVIDUAL BALLS

CROSS-REFERENCE TO RELATED APPLICATION

This application is a national phase of the international application No. PCT/JP2007/072181, filed on. Nov. 15, 2007, which claims the priority benefit of Japan application No. JP2006-312772. The content of the above applications is hereby incorporated by reference in its entirety.

BACKGROUND OF THE INVENTION

1. Field of the Invention

The present invention generally relates to a device and a method of screening for individual balls such as solder balls.

2. Description of Related Art

In manufacturing metal balls such as solder balls, in addition to individual balls with a specified sphericity (referred to as individual balls hereinafter), balls formed with a plurality of balls joined together (referred to as conjoined balls hereinafter) and balls with an abnormal shape such as elliptical balls (referred to as abnormal balls hereinafter) are formed. One of the quality items required by the metal balls is the shape. Typically, the conjoined balls and the abnormal balls are unqualified products, so they should be filtered and removed.

For the technique for screening for the conjoined balls and the abnormal balls from individual balls, conjoined balls, and abnormal balls, a device (referred to as slope rolling hereinafter) is disclosed in patent document 1, in which a collection of individual balls, conjoined balls, and abnormal balls roll down a slope that is elevated at an angle at the top, the balls are screened for according to the speed difference or the direction difference thereof, and the individual balls are recovered into a recovering container disposed at the lower end of the slope. The screening is achieved through the advantage that the individual balls descend along the slope, while the conjoined balls or the abnormal balls descend with large amplitude, wobbling like falling leaves. Accordingly, with such descending behaviours, by adjusting the slope width and the distance from the lower end of the slope to the individual balls recovering container, the conjoined balls and the abnormal balls may descend to the right or left of the slope or the front of the recovering container, and the individual balls to be recovered are recovered in the recovering container.

Also, in the patent document 1, a method for tilting the descending direction of the balls or tilting the descending direction of the balls along a right-angle direction is also disclosed.

On the other hand, a scheme is provided in patent document 2, in which a groove structure is disposed between a supply device for supplying the mixture of individual balls, conjoined balls, and abnormal balls and a slope for descending the mixture down from the supply device, and the conjoined balls and the abnormal balls are stopped at the groove structure due to a chock effect resulted from the groove structure, thereby improving the screening precision. The advantage of the proposal lies in that the individual balls with a diameter of about 300 μm can be precisely screened for.

[Patent document 1] Japanese Laid-Open Patent Publication No. 11-319728.

[Patent document 2] Japanese Laid-Open Patent Publication No. 11-319722.

The inventor discovers through a research that, when the individual balls are screened for and recovered from a mixture of individual balls, conjoined balls, and abnormal balls by utilizing a slope descending mechanism of the patent document 1 or 2, the mixture of individual balls, conjoined balls, and abnormal balls may sometimes be stuck on the slope or groove structure. Therefore, the rolling action thereof on the slope or in groove structure is blocked. The smaller the size of the individual balls, conjoined balls, and abnormal balls are being screened for, the more obvious the problem appears. When the ball size is less than or equal to 200 μm, and the diameter is below 100 μm, the balls could hardly roll down, so the screening cannot be accomplished.

SUMMARY OF THE INVENTION

The present invention is directed to a device and a method for screening for individual balls, which can solve the problem of the balls being stuck on a slope while screening for and recovering the individual balls from individual balls, conjoined balls, and abnormal balls through the slope-descending mechanism, and also have the characteristic of effectively screening for the individual balls from the mixture of individual balls, conjoined balls, and abnormal balls.

The inventor discovers that, through screening for and recovering individual balls by descending from a slope in a vented gas-tight chamber, the descend of the balls along the slope may be improved significantly, and the differences in the behaviour between the individual balls, the conjoined balls, and the abnormal balls on the slope would become significant, thereby achieving the object of the present invention.

The present invention provides a device for screening for individual balls, and the device comprises a gas-tight chamber, a supply device, a slope, and a recovering part. The supply device, the slope and the recovering part are installed inside the gas-tight chamber. A pressure reducing device is jointed to the gas-tight chamber for decompressing and maintaining the pressure of the gas-tight chamber to lower than 1000 Pa. The supply device is used for supplying the balls, the slope is for enabling the balls to descend or roll down, and the recovering part is used for recovering the balls that fly out from the slope and are separated due to a speed difference and/or a direction difference of the balls. Further, the pressure value as shown in the present invention is expressed by an absolute pressure with the absolute vacuum as 0 Pa.

The surface roughness of the slope is preferably $Rzjis \leq 1$ μm.

The pressure reducing device preferably has an adjusting mechanism for reducing the pressure in the gas-tight chamber and maintaining at a specified pressure.

The diameter of the balls is preferably less than or equal to 200 μm, and the slope is preferably provided with a heating function.

The present invention further provides a method for screening for individual balls, includes supplying balls to a slope from a supply device, rolling the balls down the slope, screening for the balls according to the speed difference and/or direction difference of the balls, and recovering the balls with a recovering part, in a gas-tight chamber with the pressure reduced to lower than 1000 Pa.

The surface roughness of the slope is preferably $Rzjis \leq 1$ μm.

The pressure in the gas-tight chamber is reduced, and preferably maintained at a specified pressure.

The diameter of the balls is preferably less than or equal to 200 μm, and the slope is preferably heated.

With the present invention, the easiness of the balls rolled down the slope may be improved significantly, and the problem of the balls being stuck on the slope while screening for and recovering the individual balls by the slope-descending mechanism may be alleviated greatly. Therefore, an essential technique is formed in realizing the device for screening for individual balls for micro balls.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
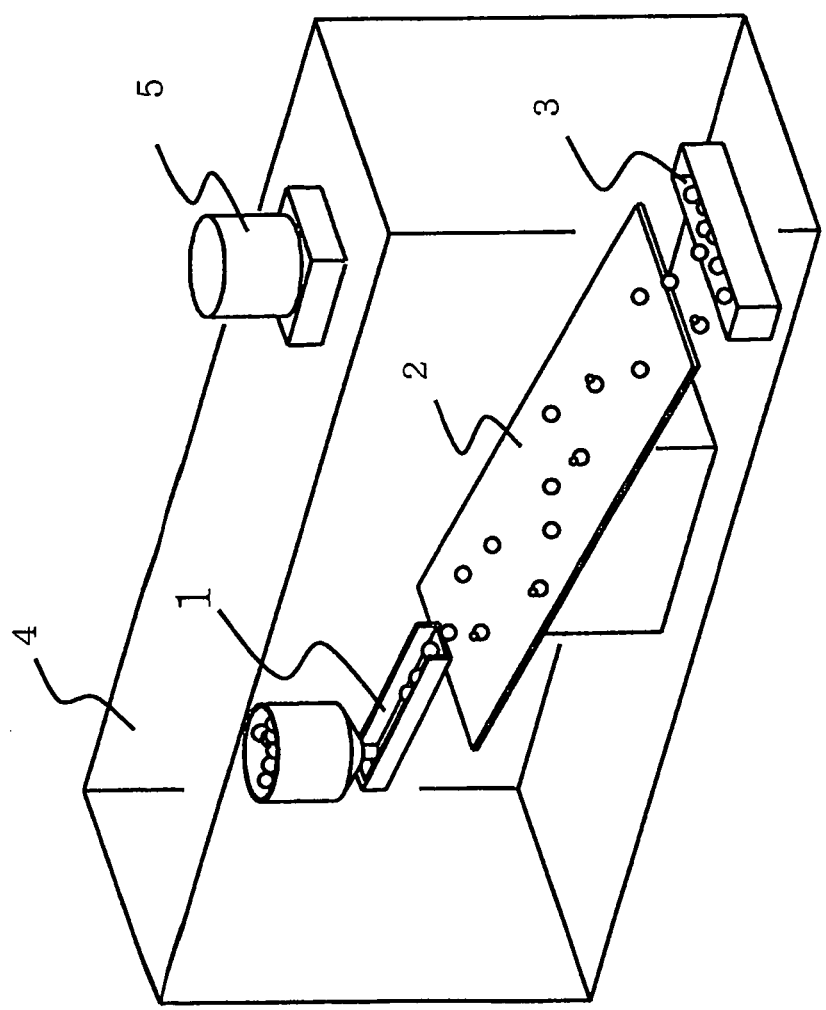
FIG. 1 shows an embodiment of a device for screening for individual balls of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention is formed because the inventor discovers that, the individual balls, the conjoined balls, and the abnormal balls may be screened for by allowing the balls to roll down a slope in a vented gas-tight chamber. Although the reason is not clear, it is believed that the influence caused by the friction of the air or the influence of the moisture contained in the air may be reduced, as compared with those in the air.

Some examples of the device for achieving the present invention are listed and illustrated in detail below.

A device for screening for individual balls of the present invention includes a supply device 1, a slope 2, a recovering part 3, a gas-tight chamber 4, and a pressure reducing device 5, as shown in FIG. 1.

FIG. 1 is a general view of a device for validating the effectiveness of screening for individual balls in a vented environment.

The present invention is illustrated below according to the components of the device of FIG. 1.

Supply Device 1

The supply device 1 is a device for supplying balls for being screened. The supply device shown in FIG. 1 is completely disposed in the gas-tight chamber 4, but may also be disposed on the outside of the gas-tight chamber 4 to continuously supply the balls for being screened. Of course, in this case, air tightness has to be guaranteed during the supplying.

Also, for the supply device 1 used to supply the balls, a feeder may also be applied to continuously supply a specified quantity of balls, and the actions of supplying and stopping the supply of the balls may be performed freely by operating from the outside of the gas-tight chamber. Herein, the feeder refers to a device that may apply a vibration to a jig carrying the supplying objects such that a specified quantity thereof is moved each time. In FIG. 1, the groove-shaped jig with a vibration generating device (not shown) is a feeder applicable to supply a certain quantity of balls as the supplying objects to the slope 2 each time. At this time, a supply device capable of monitoring the supplied weight and supplying a certain weight is preferred.

Slope 2

The slope 2 is a surface that is elevated at an angle with respective to the horizontal plane for enabling the balls to be screened to roll down. If the slope 2 is horizontal, the balls to be screened would certainly not roll, and therefore, the screening cannot be accomplished. On the other hand, if the slope 2 is vertical, the balls to be screened would fall vertically, and the individual balls, the conjoined balls, and the abnormal balls cannot be distinguished. Thus, preferably, the slope 2 is used by properly adjusting the elevation angle to enable the balls to be screened to roll down.

Also, when the balls to be screened have a large particle size of about 200 μm, they will not be influenced by the surface roughness of the slope 2 easily. On the other hand, when the balls to be screened have a small particle size being less than or equal to 100 μm the rolling action of the balls is unstable if the surface roughness of the slope 2 is high, and the precision in screening for individual balls may be reduced. Thus, preferably, the slope 2 should be used by properly adjusting the surface roughness of the slope 2, according to the particle size of the balls.

The slope 2 is preferably conductive, and more preferably, grounded, so as to avoid the electrostatic effect while the balls as objects to be screened are rolling down.

A more preferable slope configuration is illustrated below.

The surface roughness of the slope 2 is preferably such that the ten-point average roughness Rzjis specified by JIS B 0601 is less than or equal to 1 μm. It is because if the surface roughness of the slope is high, the balls will have different falling speeds, thus deteriorating the precision in screening for individual balls. The Rzjis is more preferably less than or equal to 0.3 μm.

For means constituting the slope 2, it is preferred to utilize glass with a conductive film and a monocrystalline silicon substrate forming the conductive film. For the conductive film, Cr, Ta, Nb, Ti, and ITO (Indium Tin Oxide) may be used, for example.

In FIG. 1, the slope 2 is composed of one layer, but the slope may be made up by a plurality of layers. Also, the elevation angle of each layer may be adjusted to be different from each other.

Recovering Part 3

The recovering part 3 is a recovering part for recovering the balls from the slope 2. Among the balls to be screened, the individual balls drop from the lower end of the slope 2 faster, and the conjoined balls or the abnormal balls drop from the lower end of the slope 2 in a deviated manner or with large amplitude, wobbling like falling leaves. Therefore, the speed of the individual balls drop from the slope 2 is faster, compared with the conjoined balls or the abnormal balls. The difference of flying speeds represents in the flying distances, so this characteristic can be used for differentiation. Furthermore, the flying distances of the individual balls from the lower end of the slope 2 may vary according to the particle size of the balls, or the elevation angle or the surface roughness of the slope 2. Therefore, the recovering part 3 may be arranged at a position corresponding to the flying distances of the individual balls drop from the lower end of the slope 2.

When the descending track is curved, the balls may drop from the slope at the side of the slope. That is, the balls can be screened for based on the difference in the flying direction.

The position relationship between the slope 2 and the recovering part 3 is illustrated below.

Figure 2:
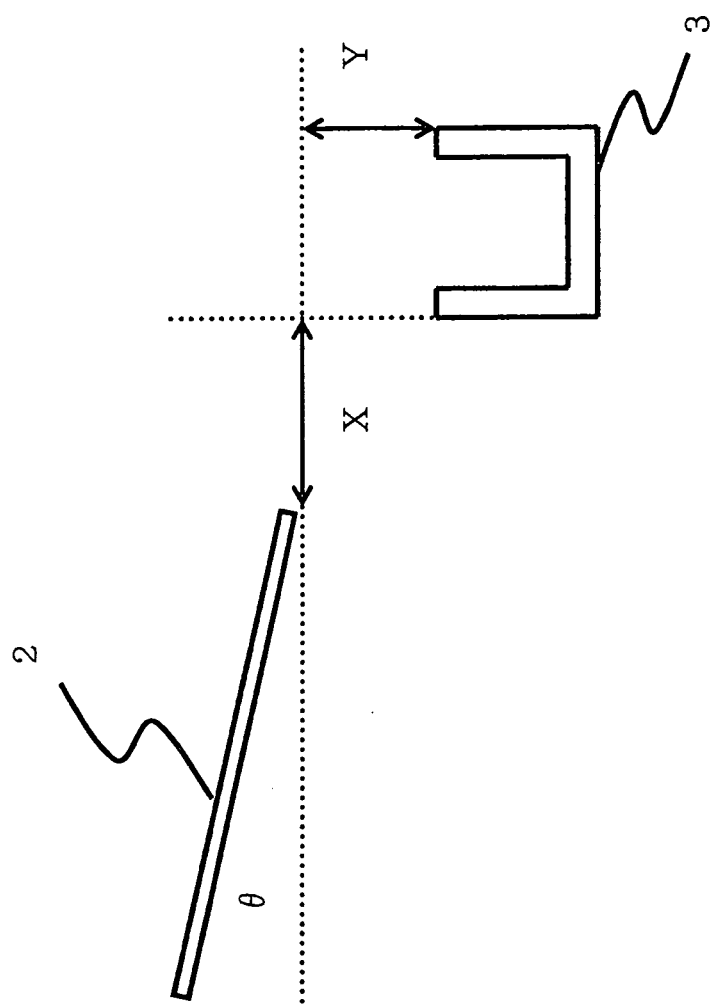
FIG. 2 is a configuration view of a slope and a recovering part of the present invention.

FIG. 2 is an example of the arrangement of the slope 2 and the recovering part 3 of the device for screening for individual balls of the present invention. If an interval X between the slope 2 and the recovering part 3 is increased, the precision in screening for individual balls would increase; however, the recovering rate of the individual balls would be reduced. On the other hand, if the interval X is reduced, the recovering rate of the individual balls would increase, but the screen precision of individual balls would decrease.

If the fall distance Y is increased, the time for the balls flying from the lower end of the slope 2 to arrive at the recovering part 3 is increased, and the difference in horizontal flying distance of the individual balls 7 arriving at the recovering part 3 and that of the conjoined balls 8 or the abnormal balls 9 would increase, thereby enhancing the precision in screening for individual balls.

Thus, the interval X and the fall Y are preferably optimized in advance by using the balls as screening objects, before the arrangement of the slope 2 and the recovering part 3 is determined.

Gas-tight Chamber 4

The gas-tight chamber 4 is used to maintain the environment of screening for the balls at a pressure reduced state for forming a gas-tight space. The gas-tight chamber 4 is preferably, for example, a vacuum container entirely made of transparent acryl, for the convenience of observing the balls rolling down the slope 2 or the balls recovered in the recovering part 3.

Herein, the pressure in the gas-tight chamber 4 should be reduced and maintained at lower than 1000 Pa. It is because that, if the pressure in the gas-tight chamber 4 is more than or equal to 1000 Pa, the difference of the flying distances of the individual balls 7 and the conjoined ball 8 or the abnormal balls 9 would be obscured under the friction effect generated by the air or the moisture on the balls or the slope 2; and therefore, it is impossible to screen for and recover the individual balls 7. The pressure is preferred to be lower than 100 Pa.

Pressure Reducing Device 5

The pressure reducing device 5 is a device for reducing and maintaining the pressure in the gas-tight chamber 4 at a pressure lower than 1000 Pa. There is a close relationship between the pressure in the gas-tight chamber 4 and the flying distance of the balls as objects to-be-screened. If the pressure in the gas-tight chamber 4 is high, the flying distance of the balls is shortened due to the friction effect caused by the air or the moisture on the balls or the slope 2; and therefore, the precision in screening for individual balls cannot be improved. Thus, a pressure reducing device is required in the device of the present invention.

In the present invention, it is preferred to use an adjusting mechanism for maintaining a specified pressure in the gas-tight chamber 4. By stably maintaining a specified pressure in the gas-tight chamber 4, the difference of the flying distances of the balls being screened for may be more reliably restricted, and the individual balls may be recovered effectively.

For the pressure reducing device 5 used in the present invention, it is preferred to utilize an oil rotary vacuum pump with a good venting capability, in which air can be vented to several Pa in a short time. Also, a Roots vacuum pump with a good venting capability, in which air up to several Pa can be vent, is preferably used together with the oil rotary vacuum pump.

To maintain a specified pressure in the gas-tight chamber 4, methods for electrically adjusting the pressure reducing device 5 may be used to monitor the pressure of the gas-tight chamber 4, and modify the difference between the leakage speed of the gas-tight chamber 4 and the venting speed formed by the pressure reducing device 5. A Bourdon tube vacuometer, a Pirani vacuometer or an ionization vacuometer may be utilized for monitoring the pressure in the gas-tight chamber 4.

As described above, when moisture is adhered to the balls to-be-screened for on the slope 2, the difference of the flying distances of the individual balls 7 and the conjoined balls 8 or the abnormal balls 9 is indefinite; therefore, it might be impossible to only recover the individual balls effectively. Thus, the slope 2 is preferably provided with a heating function to facilitate moisture removal.

The present invention may improve the rolling of the individual balls 7 on the slope 2 by venting the gas-tight chamber 4. Even if only the individual balls 7 exist, while the balls with a high sphericity and the balls with a low sphericity are rolling on the slope 2, a speed difference or a direction difference may be generated when the balls descend down the slope 2 due to the sphericity difference. Therefore, the sphericity difference may also be used for screening and recovering. Thus, the present invention is applicable to filter particles requiring extremely high sphericity, such as the solder balls used as the terminal material of electronic grid package parts.

In the present invention, if there is no restricting mechanism at the sides of the slope 2, in addition to the recovering part 3, for restricting the motion of the balls dropped from the lower end of the slope 2, the conjoined balls 8 or the abnormal balls 9 dropped from the sides of the slope 2 may bounce into the recovering part 3 due to irregular bouncing motions at the bottom of the gas-tight chamber 4. Therefore, it is preferred to dispose a mechanism on the side along longitudinal direction of the slope 2 for restricting the action of the conjoined balls 8 or the abnormal balls 9, i.e., so called NG balls, rolling down from the sides of the slope 2.

For this mechanism, grooves may be disposed at two sides along the longitudinal direction of the slope 2 for trapping, and other recovering containers may also be disposed on the bottom of the gas-tight chamber 4. The depth of the recovering container should be enough for preventing the conjoined balls 8 or the abnormal balls 9 from descending into the recovering part 3 due to bounce.

When some moisture is adhered on the balls to be screened for, the rolling of the balls as the screening object may be deteriorated. Therefore, the balls to be screened for are preferably stored in an environment that a low humidity can be maintained, such as a drier, before the screening operation so as to prevent moisture being adhered on the balls that are going to be screened for.

[Embodiment 1]

The embodiment of the present invention is illustrated with the accompanying drawings.

FIG. 1 shows an example of a device for screening for individual balls according to an embodiment of the present invention. The device for screening for individual balls of the present invention includes a supply device 1, a slope 2, a recovering part 3, a gas-tight chamber 4, and a pressure reducing device 5.

The supply device 1 is a groove-shaped piezoelectric feeder with a vibration generating device (not shown).

The slope 2 is a glass with a Ti film evaporated on the surface, in which the surface roughness thereof is Rzjis=0.06 μm. Further, the surface is electrically grounded.

The recovering part 3 is a recovering container made of stainless steel.

The gas-tight chamber 4 is fabricated with transparent acryl plates.

The pressure reducing device 5 is provided with an oil rotary vacuum pump, and an adjusting mechanism for detecting and maintaining the pressure of the gas-tight chamber by using a manometer and a leak valve.

The balls to-be-screened are a batch of solder balls, which include individual balls, conjoined balls, and abnormal balls, and the diameter of the individual balls is 80 μm.

FIG. 2 is a mode diagram of a basic position relationship of the slope 2 and the recovering part 3 of this embodiment. In the present embodiment, the elevation angle θ of the slope 2 is 3 degrees with respect to the flying direction of the metal balls. The slope 2 and the recovering part 3 are disposed in a direction parallel along the vertical direction of the depth direction in FIG. 2, with the interval X being 5 mm. The distance of the fall Y between the slope 2 and the recovering part 3 is 15 mm.

In measuring the distributions of the flying distance of the present embodiment, an adhesive piece may be disposed in advance at a position where the fall distance Y=15 mm to replace the recovering part 3 shown in FIG. 1 in order to predict the landing place.

With the device, solder balls 6 with a diameter of 80 μm are filled in the supply device 1. Then, the pressure reducing device 5 is used to vent the gas-tight chamber 4 until the pressure of the gas-tight chamber reaches 100 Pa, and the pressured is maintained in the pressure reducing device 5. The solder balls 6 are supplied from the supply device 1 to descend along the slope 2.

Firstly, as a conventional example, a test for the above solder balls 6 with a diameter of 80 μm rolling down the slope 2 is performed in an ambient air environment. At this time, the solder balls to be screened are stuck on the slope 2, and the screening process cannot be performed.

Next, the pressure of the gas-tight chamber 4 is adjusted to the range of the present invention, i.e., 100 Pa, and the slope 2 is adjusted in the same way as discussed above. The test for the solder balls 6 with a diameter of 80 μm rolling down the slope 2 is performed.

Figure 3:
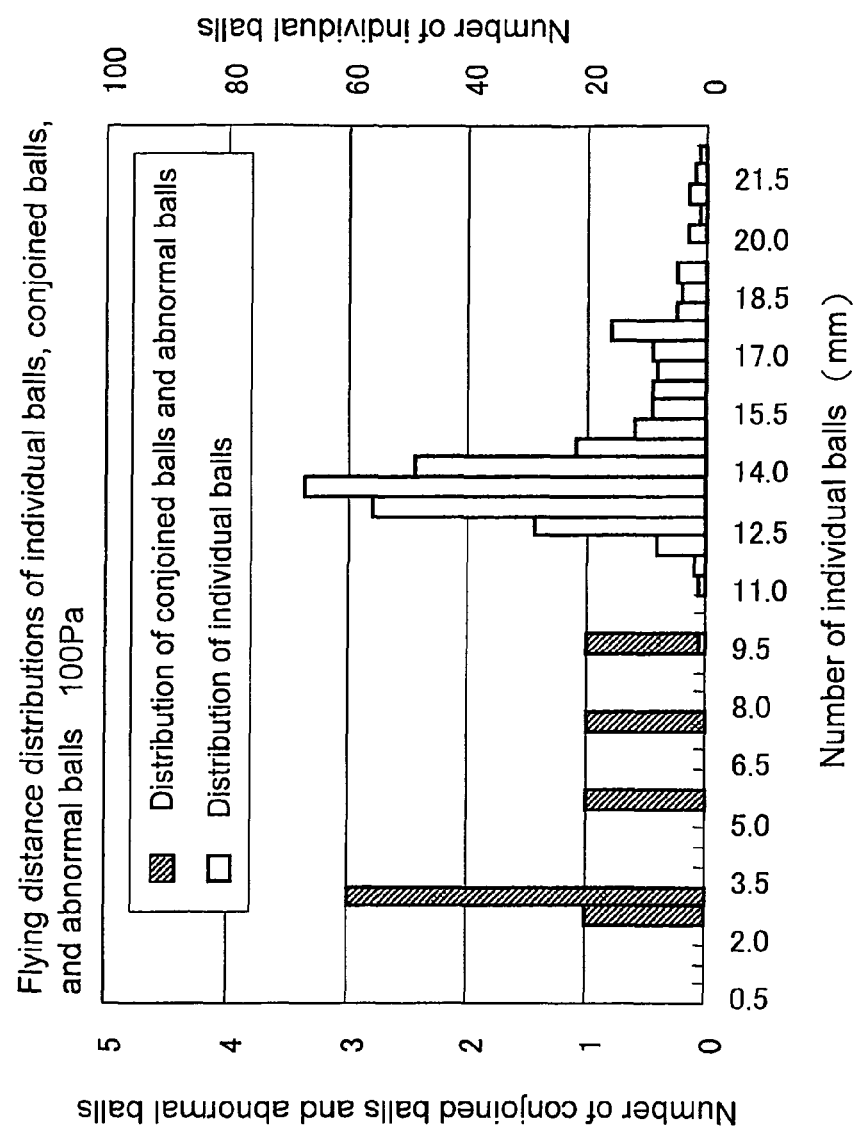
FIG. 3 is a distribution diagram of flying distances of individual balls, conjoined balls, and abnormal balls with a diameter of 80 μm when the pressure of the gas-tight chamber is 100 Pa.

FIG. 3 shows the distribution of the flying distances of the individual balls 7, the conjoined balls 8, and the abnormal balls 9 when descending down the slope 2.

As shown in FIG. 3, the distribution of the individual balls 7, the conjoined balls 8, and the abnormal balls 9 are distinguished, such that a flying distance sufficient for screening for and recovering the individual balls may be obtained. It may be confirmed that, only the individual balls 7 are filtered from the supplied solder balls 6 with a diameter of 80 μm including the conjoined balls and the abnormal balls.

Then, as a comparative example, the pressure of the gas-tight chamber 4 is adjusted outside of the range of the present invention, i.e., 1500 Pa, and the slope 2 is adjusted in the same way with the above. The test for the solder balls 6 with a diameter of 80 μm rolling down the slope 2 is carried out.

Figure 4:
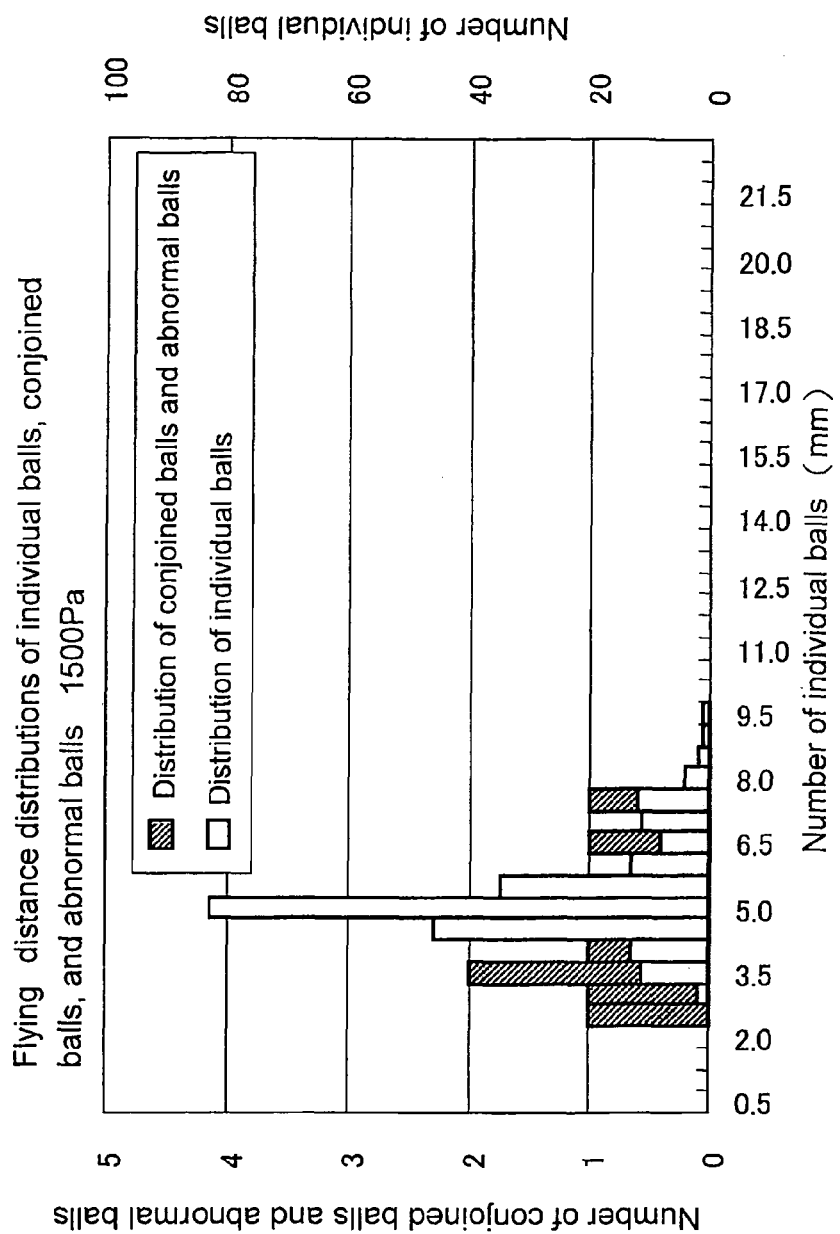
FIG. 4 is a distribution diagram of flying distances of individual balls, conjoined balls, and abnormal balls with a diameter of 80 μm when the pressure of the gas-tight chamber is 1500 Pa.

FIG. 4 shows the distribution of the flying distances of the individual balls 7, the conjoined balls 8, and the abnormal balls 9 from the slope 2.

When the pressure of the gas-tight chamber 4 is 1500 Pa, the rolling of the to-be-screened solder balls with a diameter of 80 μm may be improved, thereby solving the problem of being stuck on the slope 2. However, as shown in FIG. 4, the distribution of the flying distances of the individual balls 7, the conjoined balls 8, and the abnormal balls 9 when descending down the slope 2 are non-distinguishable; therefore, the individual balls 7 cannot be screened for and recovered precisely.

[Embodiment 2]

Figure 5:
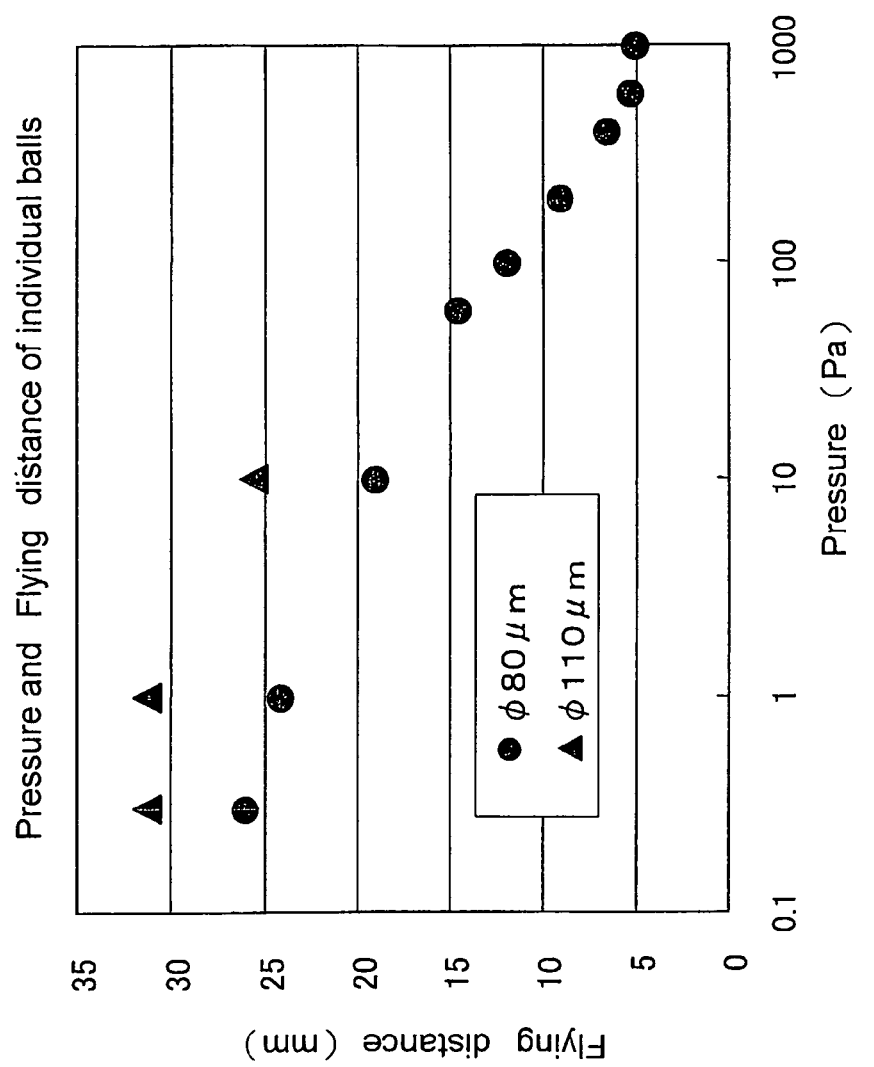
FIG. 5 is a relationship diagram of the flying distance of the individual balls among the solder balls with diameters of 80 μm and 110 μm and the pressure in the gas-tight chamber.

To confirm the relationship between the pressure of the gas-tight chamber 4 and the screening efficiency, a more detailed confirming test is performed on the relationship between the pressure in the gas-tight chamber 4 and the flying distance of the balls. Herein, the pressure condition of the gas-tight chamber 4 is changed, while the other conditions remain the same with the embodiment 1. When the above solder balls 6 with diameters of 80 μm and 110 μm roll down the slope 2, the change of the flying distance of the individual balls from the slope 2 is measured. The measurement result is shown in FIG. 5. Herein, if the pressure of the gas-tight chamber 4 is above 1000 Pa, the solder balls would not roll along the slope 2, or there is no difference in the flying distances of the individual balls 7, the conjoined balls 8, and the abnormal balls 9, so it is not shown.

As shown in FIG. 5, as the pressure of the gas-tight chamber 4 is being reduced from 1000 Pa, the flying distance of the individual balls 7 is extended. It means that, on the slope 2, the rolling speed of the individual balls 7 is increased. Since the rolling speed of the individual ball 7 is increased, the quantity of the balls being supplied to the slope 2 may increase, which also enhances the yield.

As shown in FIG. 5, with the particle size being 80 μm, the flying distance would be increased before the pressure in the gas-tight chamber 4 reaches 0.3 Pa. On the other hand, with the particle size being 110 μm, it is confirmed that the flying distance would not be increased when the pressure of the gas-tight chamber 4 is less than 1 Pa. Therefore, the relationship between the pressure in the gas-tight chamber 4 and the flying distance of the individual balls 7 depends on the diameter of the individual balls 7.

It may be known through the test that, there is a close relationship between the pressure of the gas-tight chamber 4 and the flying distance of the balls. If the pressure is reduced, the flying distance of the balls would be lengthened. It may be confirmed that, stably maintaining a specified pressure in the gas-tight chamber 4 is important in stabilizing the flying distances of the individual balls 7 at the lower end of the slope 2 and obtaining a high precision in the screening for and recovering of individual balls.

[Embodiment 3]

Figure 6:
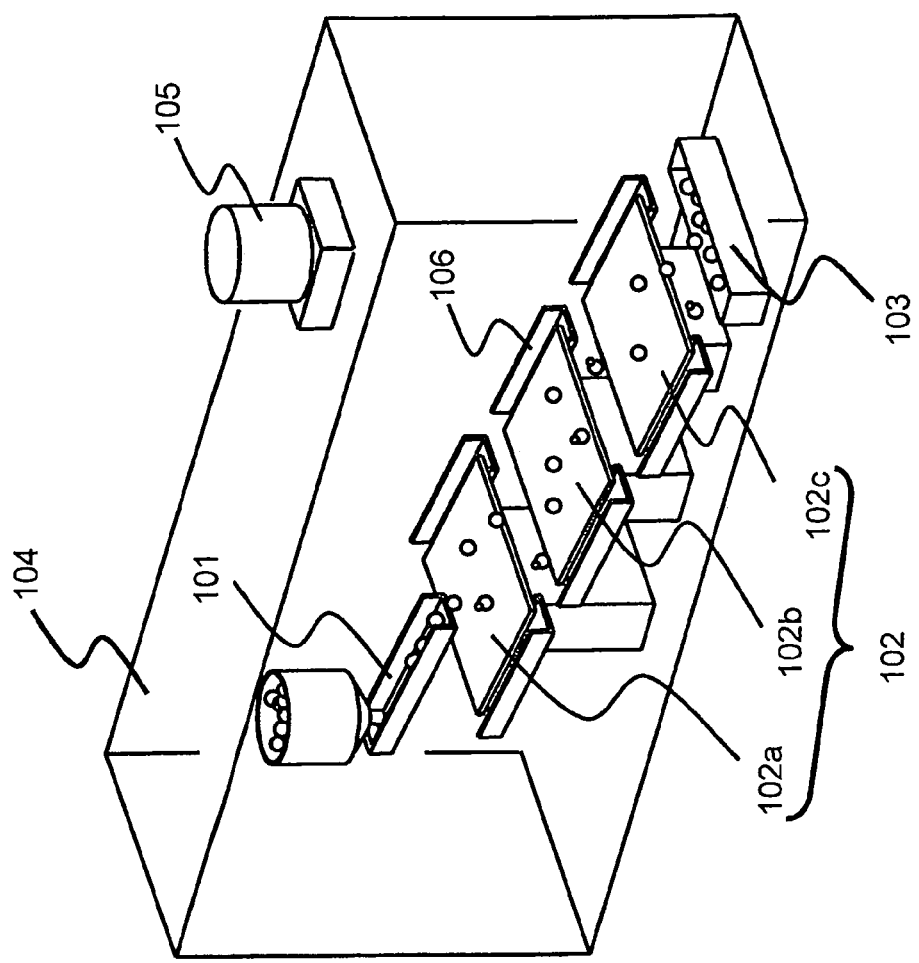
FIG. 6 shows another embodiment of the device for screening for individual balls of the present invention.

FIG. 6 shows another example of the device for screening for individual balls of the present invention. As shown in FIG. 6, the device for screening for individual balls includes a supply device 101, a slope 102, a recovering part 103, a gas-tight chamber 104, a pressure reducing device 105, and a NG receiving groove 106. At this time, among the balls to-be-screened, the concentration of the conjoined balls included in the individual balls is 100 ppm, and solder balls with a diameter of 110 μm are used.

The supply device 101 is configured with a piezoelectric feeder the same as that of the embodiment 1 in the gas-tight chamber 104.

The slope 102 is composed of three layers, and the constituent elements thereof are three pieces of glasses 102a, 102b, and 102c, and the elevation angles of the slopes are 3 degrees, respectively. Each slope 102 is formed with a conductive ceramic film ITO on the glass surface, and the surface roughness thereof is Rzjis=0.06 μm. Further, the surface is electrically grounded.

The recovering part 103 is a container made of stainless steel, and if the position from the slope 102c is expressed in the same way with the position relationship shown in FIG. 2, the interval X is 5 mm, and the fall distance Y between the slope 102c and the recovering part 103 is 15 mm.

The gas-tight chamber 104 is composed of transparent acryl plates.

The pressure reducing device 105 is provided with an oil rotary vacuum pump, and an adjusting mechanism for detecting and maintaining the pressure of the gas-tight chamber by using a manometer and a leak valve, and the pressure is adjusted to 100 Pa.

The NG ball receiving groove 106 is an L-shaped aluminium tray available in the market.

Figure 7:
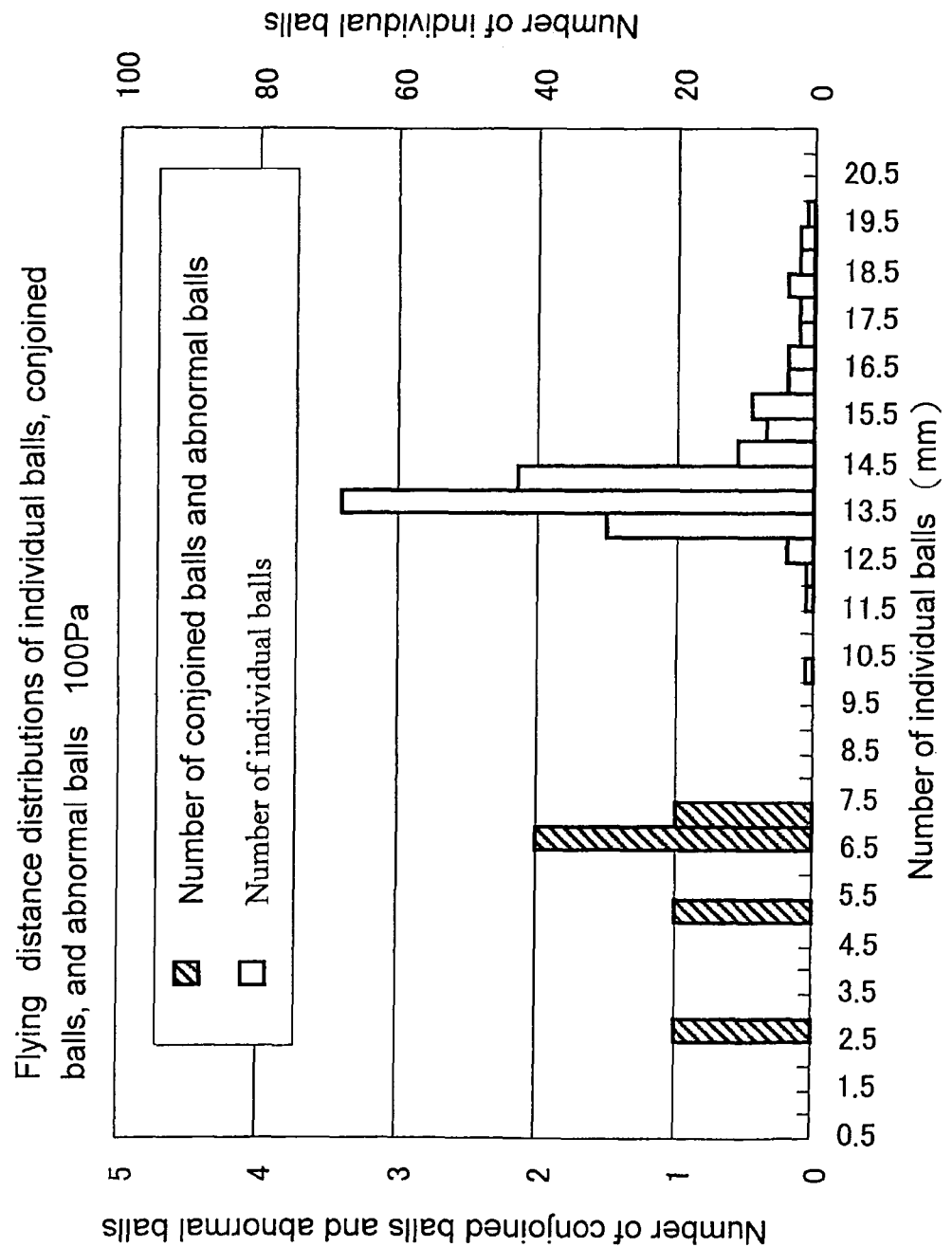
FIG. 7 is a distribution diagram of flying distances of individual balls, conjoined balls, and abnormal balls with a diameter of 80 μm when the slope is not heated.

When the solder balls are screened with the screening device shown in FIG. 7, the concentration of the conjoined balls can be reduced overwhelmingly through one screening process. At this time, the yield of the individual balls that are being screened for is 98%, and the concentration of the conjoined balls is 0.015 ppm. Further, the concentrations of the conjoined balls at each position of the constituent elements 102a, 102b, and 102c of the slope 102 are reduced. It has been confirmed that, through constituting the slope 102 by a plurality of layers, the precision in the screening for and the recovering of the individual balls may increase.

[Embodiment 4]

Then, four slopes 2 with different surface roughness Rzjis shown in Table 1 are prepared. The elevation angles of the slopes 2 are tilted for 5 degrees, and other conditions are same as those of the embodiment 1. The balls are supplied to the slope 2 by the supply device 1, then the action of the balls on the slope 2 is observed and the number of the balls stopped on the slope 2 is determined. In this test, the particle sizes of the balls are 70 μm and 90 μm, and one million balls including individual balls, conjoined balls, and abnormal balls are supplied to the slope 2. Further, the concentration of the conjoined balls and the abnormal balls included in the supplied balls is 1000 ppm, respectively.

The observation result is as shown in Table 1. The balls stopped on the slope 2 are nearly all conjoined balls and abnormal balls. As shown in Table 1, with the particle size of the balls being 70 μm, the number of the stopped balls is 10 when the surface roughness Rzjis is 1.00 μm. With the particle size of the balls being 90 μm, the number of the stopped balls is 300 when the surface roughness Rzjis is 1.18 μm. It may be confirmed that, as the particle size of the balls become smaller, the balls would be influenced by the surface roughness of the slope 2. Therefore, if the particle size of the individual balls to be screened for and recovered becomes smaller, the balls are not stopped by reducing the surface roughness Rzjis of the slope 2; a stable ball action is achieved. It has been confirmed that the present invention is effective in raising yield.

[Table 1]

Table 1 is a statistical table of the number of the solder balls with diameters of 70 μm and 90 μm stopped on the slope for different surface roughness of the slope.

Number of balls stopped on slope:

|           | Surface roughness |      |      |      |
|-----------|-------------------|------|------|------|
| Rzjis (μm)| 1.18              | 1.00 | 0.30 | 0.14 |
| φ70 μm    | 500               | 10   | 0    | 0    |
| φ90 μm    | 300               | 0    | 0    | 0    |

[Embodiment 5]

Then, the confirmation result for changing the flying distances of the balls by heating the slope 2 is illustrated. The device for screening for individual balls as shown in FIG. 1 is used in the test, and a planar heater (not shown) is used to heat the back of the slope 2. At this time, a thermocouple and a temperature regulator are used to maintain the surface temperature of the slope 2 at 40° C. The thermometer portion of the thermocouple contacts the slope 2, and the other terminal is connected with the temperature regulator. The temperature regulator can convert a thermal electromotive force of the thermocouple into temperature and perform a comparison with a preset object temperature to regulate the current output to the planar heater.

In test, the balls are supplied to the slope 2 to roll down, and the distribution of the flying distances of the individual balls, the conjoined balls, and the abnormal balls are investigated, under the followings two circumstances. In one circumstance, the planar heater is absent. In the other circumstance, the above planar heater is used to maintain the temperature of the slope 2 at 40° C. At this time, the other testing conditions except the presence of the heater are the same as those of the embodiment 1. The balls used in the evaluation have a same particle size of 80 μm as that in embodiment 1, and the pressure of the gas-tight chamber 4 is 100 Pa.

Figure 8:
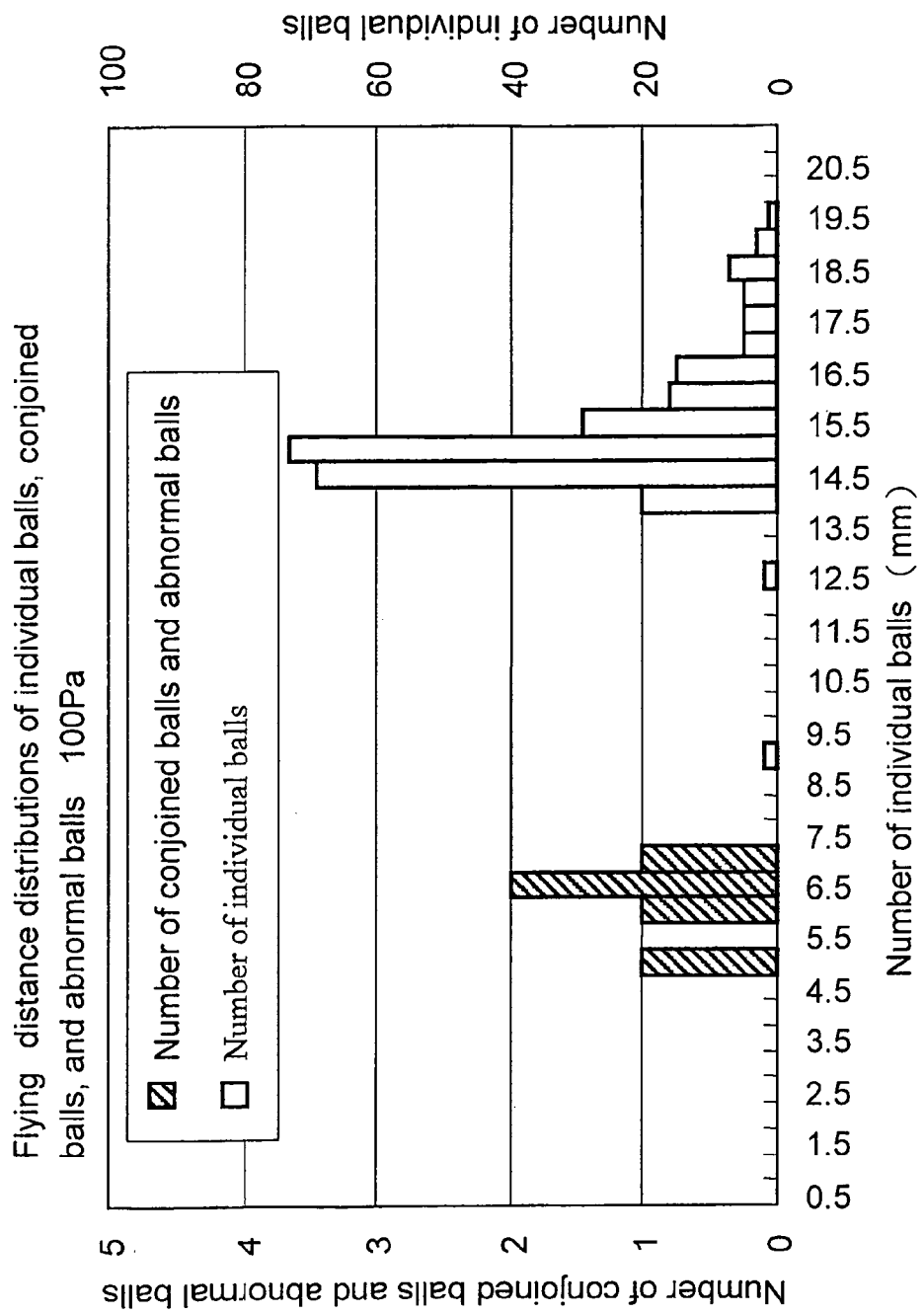
FIG. 8 is a distribution diagram of flying distances of individual balls, conjoined balls, and abnormal balls with a diameter of 80 μm when the slope is heated.

FIG. 7 shows the distribution of the flying distances when a planar heater is not used. FIG. 8 shows the distribution of the flying distance when a planar heater is used.

As shown in the drawings, while there is no obvious difference in the flying distances of the conjoined balls and the abnormal balls due to the presence of the heater, the average flying distance of the individual balls is 14.1 mm without using a heater, and is 15.2 mm on with using a heater, which is about 1.1 mm farther compared with the former. It may be confirmed that, the individual balls, the conjoined balls, and the abnormal balls can be distinguished and recovered more precisely by heating the slope 2.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device of screening for individual balls, comprising:
a supply device configured to supply balls;
a slope configured to enable the balls to roll down, wherein the slope comprises a conductive film;
a recovering part configured to recover the balls that fly out from the slope and are separated due to a speed difference and/or a direction difference of the balls generated in the process of the balls rolling down along the slope;
a gas-tight chamber in which the supply device, the slope, and the recovering part are installed inside, wherein the balls roll down along the slope in the gas-tight chamber; and a pressure reducing device configured to joint to the gas-tight chamber for decompressing and maintaining a pressure in the gas-tight chamber below 1000 Pa.

2. The device of screening for individual balls according to claim 1, wherein a surface roughness of the slope is Rzjis ≤1 μm.

3. The device of screening for individual balls according to claim 1, wherein the pressure reducing device is provided with an adjusting mechanism for reducing the pressure in the gas-tight chamber and maintaining at a specified pressure.

4. The device of screening for individual balls according to claim 1, wherein the slope is provided with a heating function.

5. The device of screening for individual balls according to claim 1, wherein a diameter of the balls is less than or equal to 200 μm.

6. A method of screening for individual balls, comprising:
supplying balls to a slope from a supply device, wherein the slope comprises a conductive film;
rolling down the balls along the slope in a gas-tight chamber;
screening for the balls according to a speed difference and/or a direction difference of the balls generated in the process of the balls rolling down along the slope; and
recovering the balls by using a recovering part, in the gas-tight chamber with a pressure below 1000 Pa.

7. The method of screening for individual balls according to claim 6, wherein a surface roughness of the slope is Rzjis ≤1 μm.

8. The method of screening for individual balls according to claim 6, wherein the pressure in the gas-tight chamber is reduced, and maintained at a specified pressure.

9. The method of screening for individual balls according to claim 6, wherein the slope is heated.

10. The method of screening for individual balls according to claim 6, wherein a diameter of the balls is less than or equal to 200 μm.

11. The method of screening for individual balls according to claim 7, wherein the pressure in the gas-tight chamber is reduced, and maintained at a specified pressure.

12. The method of screening for individual balls according to claim 7, wherein the slope is heated.

13. The method of screening for individual balls according to claim 7, wherein a diameter of the balls is less than or equal to 200 μm.

14. The device of screening for individual balls according to claim 2, wherein the pressure reducing device is provided with an adjusting mechanism for reducing the pressure in the gas-tight chamber and maintaining at a specified pressure.

15. The device of screening for individual balls according to claim 2, wherein the slope is provided with a heating function.

16. The device of screening for individual balls according to claim 2, wherein a diameter of the balls is less than or equal to 200 μm.

17. The device of screening for individual balls according to claim 1, wherein the conductive film is selected from a group consisted of Cr, Ta, Nb, Ti, and ITO.

18. The method of screening for individual balls according to claim 6, wherein the conductive film is selected from a group consisting of Cr, Ta, Nb, Ti, and ITO.

\* \* \* \* \*